(12) United States Patent
Takahashi

(10) Patent No.: US 10,482,044 B2
(45) Date of Patent: Nov. 19, 2019

(54) COMPUTER, DEVICE CONTROL SYSTEM, AND DEVICE CONTROL METHOD FOR DIRECT MEMORY ACCESS

(71) Applicant: NEC Corporation, Tokyo (JP)

(72) Inventor: Masahiko Takahashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 204 days.

(21) Appl. No.: 15/541,393

(22) PCT Filed: Jan. 15, 2016

(86) PCT No.: PCT/JP2016/000191
§ 371 (c)(1),
(2) Date: Jul. 3, 2017

(87) PCT Pub. No.: WO2016/114144
PCT Pub. Date: Jul. 21, 2016

(65) Prior Publication Data
US 2018/0024952 A1      Jan. 25, 2018

(30) Foreign Application Priority Data
Jan. 16, 2015   (JP) .................................. 2015-006417

(51) Int. Cl.
*G06F 13/28* (2006.01)
*G06F 13/24* (2006.01)
(Continued)

(52) U.S. Cl.
CPC .............. *G06F 13/28* (2013.01); *G06F 13/14* (2013.01); *G06F 13/24* (2013.01);
(Continued)

(58) Field of Classification Search
None
See application file for complete search history.

(56) References Cited

U.S. PATENT DOCUMENTS 7,984,203 B2 * 7/2011 Madukkarumukumana ................
G06F 13/28
710/22
8,671,152 B2 * 3/2014 Horie .................... G06F 13/105
370/229

(Continued)

FOREIGN PATENT DOCUMENTS

JP      2007-219873 A      8/2007
JP      2008-146541 A      6/2008
(Continued)

OTHER PUBLICATIONS

'Mastering the DMA and IOMMU APIs' by Laurent Pinchart, Embedded Linux Conference 2014, San Jose. (Year: 2014).*

(Continued)

*Primary Examiner* — Steven G Snyder
(74) *Attorney, Agent, or Firm* — Sughrue Mion, PLLC

(57) ABSTRACT

To realize DMA data transfer between a host computer and another computer even in the case that the host computer and the another computer are each equipped with a CPU, a memory, and so forth independently. A computer communicably connected with a first computer including a first memory and a driver for controlling a device, the computer comprising: the device; and a second memory, wherein a first DMA transfer is executed based on a DMA transfer request received from the driver, a second DMA transfer is executed to transfer data existing at a transfer destination address of the first DMA transfer between the first memory and the second memory, and the transfer destination address is detected as a result of executing the first DMA transfer.

13 Claims, 9 Drawing Sheets

(51) Int. Cl.
  *G06F 13/42* (2006.01)
  *G06F 15/173* (2006.01)
  *G06F 13/14* (2006.01)

(52) U.S. Cl.
  CPC .... *G06F 13/4282* (2013.01); *G06F 15/17331* (2013.01); *G06F 2213/0026* (2013.01)

(56) References Cited

U.S. PATENT DOCUMENTS

| | | | |
|---|---|---|---|
| 9,003,077 B2* | 4/2015 | Ye | G06F 13/28 710/26 |
| 9,176,911 B2* | 11/2015 | Davis | G06F 13/28 |
| 9,262,197 B2* | 2/2016 | Chawla | G06F 9/45558 |
| 9,317,444 B2* | 4/2016 | Davda | G06F 12/1081 |
| 9,323,701 B2* | 4/2016 | Shankar | G06F 13/28 |
| 9,460,024 B2* | 10/2016 | Davda | G06F 12/1081 |
| 10,061,724 B2* | 8/2018 | Davda | G06F 12/1081 |
| 10,303,644 B2* | 5/2019 | Franke | G06F 15/17331 |
| 2007/0198763 A1 | 8/2007 | Suzuki et al. | |
| 2008/0013448 A1* | 1/2008 | Horie | G06F 13/105 370/229 |
| 2012/0254582 A1* | 10/2012 | Raj | G06F 12/1081 711/206 |
| 2013/0086285 A1* | 4/2013 | Ye | G06F 13/28 710/26 |
| 2013/0124929 A1 | 5/2013 | Harada et al. | |
| 2014/0164545 A1* | 6/2014 | Davis | G06F 13/28 709/212 |
| 2014/0223071 A1 | 8/2014 | Bert et al. | |
| 2014/0281055 A1* | 9/2014 | Davda | G06F 12/1081 710/26 |
| 2014/0281056 A1* | 9/2014 | Davda | G06F 12/1081 710/26 |
| 2015/0089009 A1* | 3/2015 | Tsirkin | G06F 3/067 709/212 |
| 2015/0220481 A1* | 8/2015 | Tanimoto | G06F 12/1081 711/128 |
| 2015/0261686 A1* | 9/2015 | Nampoothiri | G06F 13/28 710/308 |
| 2016/0019079 A1* | 1/2016 | Chawla | G06F 9/45558 710/308 |
| 2016/0034407 A1* | 2/2016 | Shankar | G06F 13/28 710/22 |
| 2016/0147709 A1* | 5/2016 | Franke | G06F 15/17331 709/212 |
| 2016/0294983 A1* | 10/2016 | Kliteynik | G06F 15/17331 |
| 2017/0024341 A1* | 1/2017 | Davda | G06F 12/1081 |
| 2017/0206169 A1* | 7/2017 | Coppola | G06F 9/44505 |

FOREIGN PATENT DOCUMENTS

| | | |
|---|---|---|
| JP | 2012-168871 A | 9/2012 |
| JP | 2014-154155 A | 8/2014 |
| WO | 2008/068937 A1 | 6/2008 |
| WO | 2012/014400 A1 | 2/2012 |

OTHER PUBLICATIONS

'Page Fault Support for Network Controllers' by Ilya Lesokhin et al., copyright 2017. (Year: 2017).*
Written Opinion of the International Searching Authority of PCT/JP2016/000191 dated Feb. 9, 2016.
International Search Report of PCT/JP2016/000191 dated Feb. 9, 2016.

* cited by examiner

Fig. 2

| LOGICAL PHYSICAL- ADDRESS | PHYSICAL ADDRESS | PERMISSION ATTRIBUTE |
|---|---|---|

Fig. 5

| LOGICAL PHYSICAL-ADDRESS | PHYSICAL ADDRESS | PERMISSION ATTRIBUTE |
|---|---|---|
| 0x2000 | 0x2000 | READ-WRITE PERMISSION |

Fig. 6

| LOGICAL PHYSICAL-ADDRESS | PHYSICAL ADDRESS | PERMISSION ATTRIBUTE |
|---|---|---|
| 0x20000 | 0x2000 | READ-WRITE PERMISSION |
| 0x40000 | 0x4000 | WRITE PERMISSION |

COMPUTER, DEVICE CONTROL SYSTEM, AND DEVICE CONTROL METHOD FOR DIRECT MEMORY ACCESS

CROSS REFERENCE TO RELATED APPLICATIONS

This application is a National Stage of International Application No. PCT/JP2016/000191 filed Jan. 15, 2016, claiming priority based on Japanese Patent Application No. 2015-006417 filed Jan. 16, 2015, the contents of all of which are incorporated herein by reference in their entirety.

TECHNICAL FIELD

The present invention relates to a computer and the like for transferring data between a host device and a device, which exists apart from the host device, through a system bus.

BACKGROUND ART

A computer includes a CPU (Central Processing Unit) and various devices as main components. As an example of the device, a display, a printer, a hard disk drive, a network interface card or the like is exemplified. The CPU and the device are connected to each other through a system bus (hereinafter, denoted as "bus"). By the CPU's executing a predetermined program, access to the device is executed. To access the device is referred to as an input/output (I/O) process. The device is controlled by software of an operating system (hereinafter, denoted as "OS") which the CPU executes. Especially, software, which controls the device, out of OS is denoted as a device driver.

While executing OS, a user can use one or more pieces of application software in order to achieve a predetermined aim. This is executed by OS's control. In order to prevent the application software from directly accessing the device, OS generally has high level execution authority in comparison with the application software.

When the computer is activated, the device is scanned by BIOS (Basic Input/Output System), and is assigned an identifier (ID), a memory area and the like. At this point of time, the device is not in an available state. After OS is activated, a device driver relating to a device, which OS can control, out of the scanned devices initializes the device. By executing the initialization, the device enters into the available state.

As a method of a working OS's accessing the device, two methods are known. That is, one is a method of access by issuing an I/O command, and the other is a method of access by MMIO (Memory-Mapped I/O).

In the case of the method of access by issuing the I/O command, an I/O command, which is defined by a CPU command set, is used. By OS's issuing an CPU command, the I/O command is outputted on the bus, and consequently access to the device is executed.

Meanwhile, in the case of the method of access by MMIO, when OS accesses a specific memory address, a chipset, which controls CPU or the bus, converts the memory address into the I/O command and outputs the I/O command on the bus, and consequently access to the device is executed.

As mentioned above, when BIOS scans the device, a memory space size, which the device requests, is assigned in physical memory space. Consequently, memory access to the assigned physical memory space is converted into the I/O command. Hereinafter, the above-mentioned two methods (methods of the working OS's accessing the device) are referred to as "I/O command" collectively.

Generally, a form of the above-mentioned I/O command and a form of the I/O command, which is used on the bus, are different each other. As an example of CPU, a CPU command set based on the Intel (registered trademark) architecture includes an IN (input) command and an OUT (output) command. As an example of the bus, PCI (Peripheral Component Interconnect) Express® (registered trademark: hereinafter, description of "registered trademark" is omitted.) is exemplified. I/O commands of PCI (Peripheral Component Interconnect) Express include an I/O Read request and an I/O Write request.

OS makes data transmitted/received to/from the device through the I/O command.

At this time, OS has a function to make data transferred directly between memories, or a memory and an I/O device. More specifically, the function is called DMA (Direct Memory Access) that the device takes the lead in directly reading/writing data from/in a memory designated by OS, and the device includes DMAC (DMA control unit) which executes the function. Since a load of CPU becomes decreasing when the device uses DMA, DMA is a mandatory function for a high-performance system. Each of patent literatures (PTL) 1 and 2 discloses an art of a data transfer system based on DMA.

Furthermore, PTL 3 discloses an art for extending a distance between CPU and the device by extending the bus virtually. The art makes it possible to physically extend the distance between CPU and the device by transferring data, which flow through a PCI Express interface, to a network such as Ethernet (registered trademark: hereinafter, description of "registered trademark" is omitted.), or the like. Here, the PCI Express interface transfers the data in a form of TLP (Transaction Layer Packet).

CITATION LIST

Patent Literature

[PTL 1] WO 2008/068937
[PTL 2] Japanese Patent Application Laid-Open Publication No. 2008-146541
[PTL 3] Japanese Patent Application Laid-Open Publication No. 2007-219873

SUMMARY OF INVENTION

Technical Problem

However, PTLs 1 and 2 do not disclose an art of executing a data transfer based on DMA between a host computer which includes a device driver, and a remote computer which exists apart from the host computer and which includes a device corresponding to the device driver. Hereinafter, the host computer which has the above-mentioned configuration is simply referred to as "host computer" and the remote computer which has the above-mentioned configuration is simply referred to as "remote computer".

Moreover, according to the bus extension art which is described by PTL 3, it is difficult to execute the data transfer based on DMA in the case that the host computer and the remote computer are independent from each other (that is, in the case that each computer includes a CPU and a memory).

The reason is that a computer cannot access a memory of another computer when the computers are independent from each other.

The present invention is conceived in an attempt to solve the above-mentioned problem. A main object of the present invention is to provide a computer and the like which enable the DMA data transfer between a host computer and another computer even in the case that the host computer and the another computer are each equipped with a CPU, a memory, and so forth independently.

Solution to Problem

To solve the above problems, first aspect of the present invention is:

a computer communicably connected with a first computer including a first memory and a driver for controlling a device, the computer comprising:

the device; and a second memory, wherein a first DMA transfer is executed based on a DMA transfer request received from the driver, a second DMA transfer is executed to transfer data existing at a transfer destination address of the first DMA transfer between the first memory and the second memory, and the transfer destination address is detected as a result of executing the first DMA transfer.

Second aspect of the present invention is:

a device control system, comprising:

the computer according to any one of claims 1 to 5; and the first computer, wherein the first computer and the computer are connected to each other so as to be able to communicate through a network.

Third aspect of the present invention is:

a device control method wherein a computer communicably connected with a first computer including a first memory and a driver for controlling a device, the computer including a second memory, the computer executing a first DMA transfer based on a DMA transfer request received from the driver, and a second DMA transfer to transfer data existing at a transfer destination address of the first DMA transfer between the first memory and the second memory, the transfer destination address being detected as a result of executing the first DMA transfer.

Advantageous Effects of Invention

According to the present invention, even in the case that a host computer and a remote computer are each equipped with a CPU, a memory, and so forth independently, it is possible to provide a computer and the like which enable the DMA data transfer between the host computer and the remote computer.

BRIEF DESCRIPTION OF DRAWINGS

FIG. 2 is a diagram illustrating composition of a page table which an I/O memory management unit includes according to the first example embodiment of the present invention.

FIG. 5 is a diagram illustrating an example of using the page table which the I/O memory management unit includes according to the first example embodiment of the present invention.

FIG. 6 is a diagram illustrating an example of using the page table which the I/O memory management unit includes according to the first example embodiment of the present invention.

DESCRIPTION OF EMBODIMENTS

Figure 1:
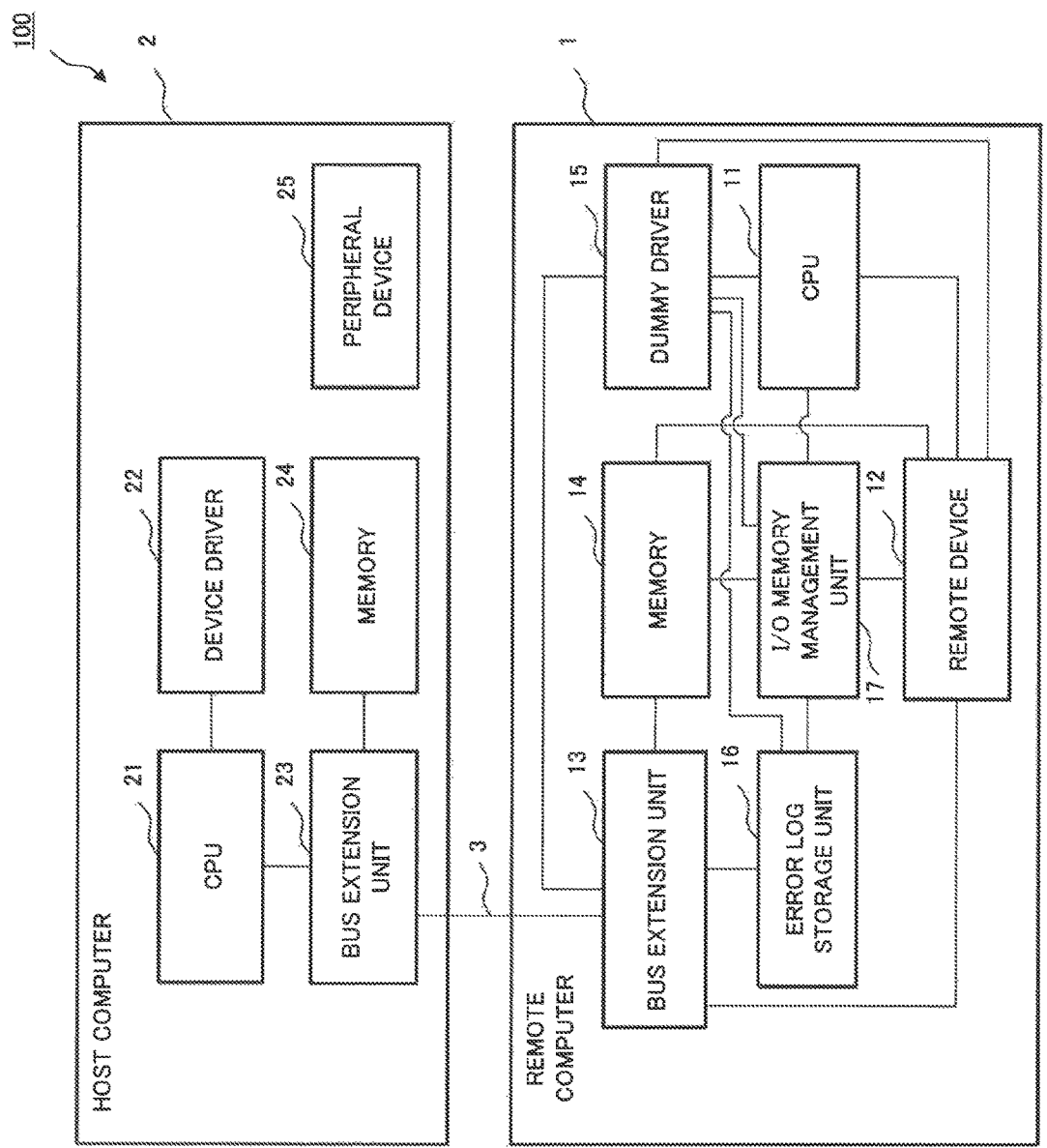
FIG. 1 is a diagram illustrating a configuration of a remote device control system according to a first example embodiment of the present invention.

Next, an example embodiment of the present invention will be explained with reference to drawings. In the drawings, the same or similar elements are denoted by the same or similar reference numerals. However, each of the drawings schematically illustrates a configuration in the example embodiment of the present invention. Furthermore, the example embodiment of the present invention, which will be illustrated later, is a mere example and can be modified appropriately within a scope whose essence is identical to the present invention.

Figure 8:
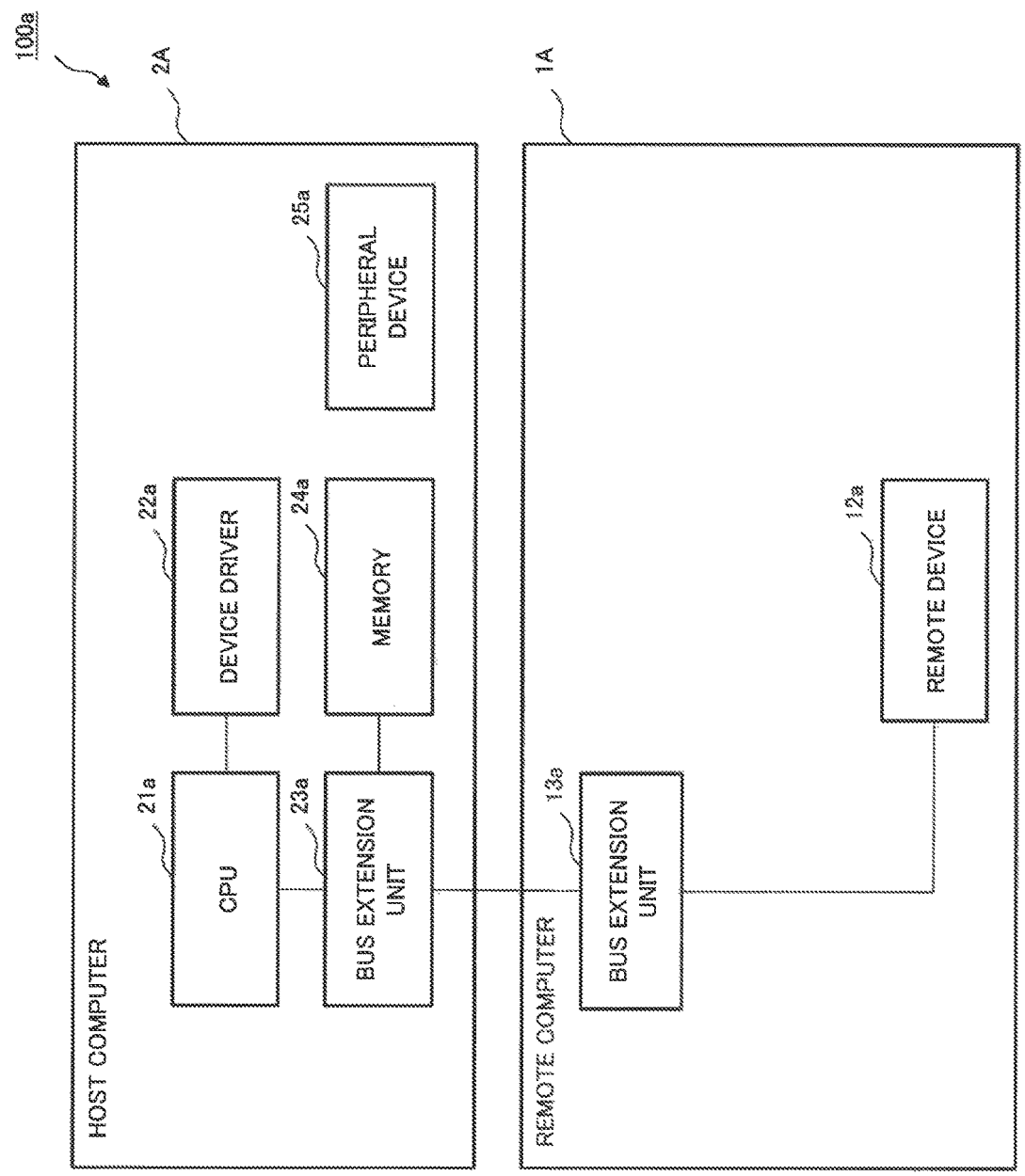
FIG. 8 is a diagram illustrating a configuration of a remote device control system in which a host computer and a remote computer are independent from each other.

Firstly, an overview of each example embodiment, which will be explained later in detail, will be explained in the following. The inventor of the present application proposes to apply the bus extension art, which is described in PTL 3, to a general computer system. A specific example of this proposal is a remote device control system 100a illustrated in FIG. 8. The remote device control system 100a includes a host computer 2A and a remote computer 1A which exists separately from the host computer 2A.

The remote computer 1A includes a bus extension unit 13a and a remote device 12a. The bus extension unit 13a forms a pair with a bus extension unit 23a existing on the host computer 2A side, and executes transmission or reception of a packet. The bus extension unit 13a is composed of hardware, software or a combination of hardware and software, which are compatible with the PCI Express standards. The bus extension unit 13a executes encapsulation of TLP.

The remote device 12a is a device which is mounted on the remote computer 1A side or connected to the remote computer 1A side.

The host computer 2A includes a CPU 21a, a device driver 22a, a bus extension unit 23a, a memory 24a and a peripheral device 25a. The CPU 21a is a central control device of the host computer 2A. The device driver 22a is software (computer program or program module) which controls an operation of the remote device 12a which exists on the remote computer 1A side. The bus extension unit 23a forms a pair with the bus extension unit 13a existing on the remote computer 1A side, and executes transmission or reception of a packet. The bus extension unit 23a is composed of hardware, software or a combination of hardware and software, which are compatible with the PCI Express standards. The bus extension unit 23a executes encapsulation of TLP. The memory 24a is a storage device which includes ROM (Read Only Memory), RAM (Random Access Memory), or the like.

The remote device control system 100a is a system in which a bus of the host computer 2A virtually extends to the remote computer 1A by equipping the bus extension unit 13a and the bus extension unit 23a using, for example, the PCI Express Ethernet bridge. The remote computer 1A, which includes the remote device 12a, is not equipped with a CPU and a memory.

The bridge (that is, the bus extension unit 13a and the bus extension unit 23a), executes encapsulation of a packet or de-capsulation (release of encapsulation) of a packet. By execution of the encapsulation, the packet can be sent on a bus of the Ethernet network. Hereinafter, the packet which flows in the Ethernet network (that is, between the bus extension unit 13a and the bus extension unit 23a) is denoted as "network packet".

Figure 9:
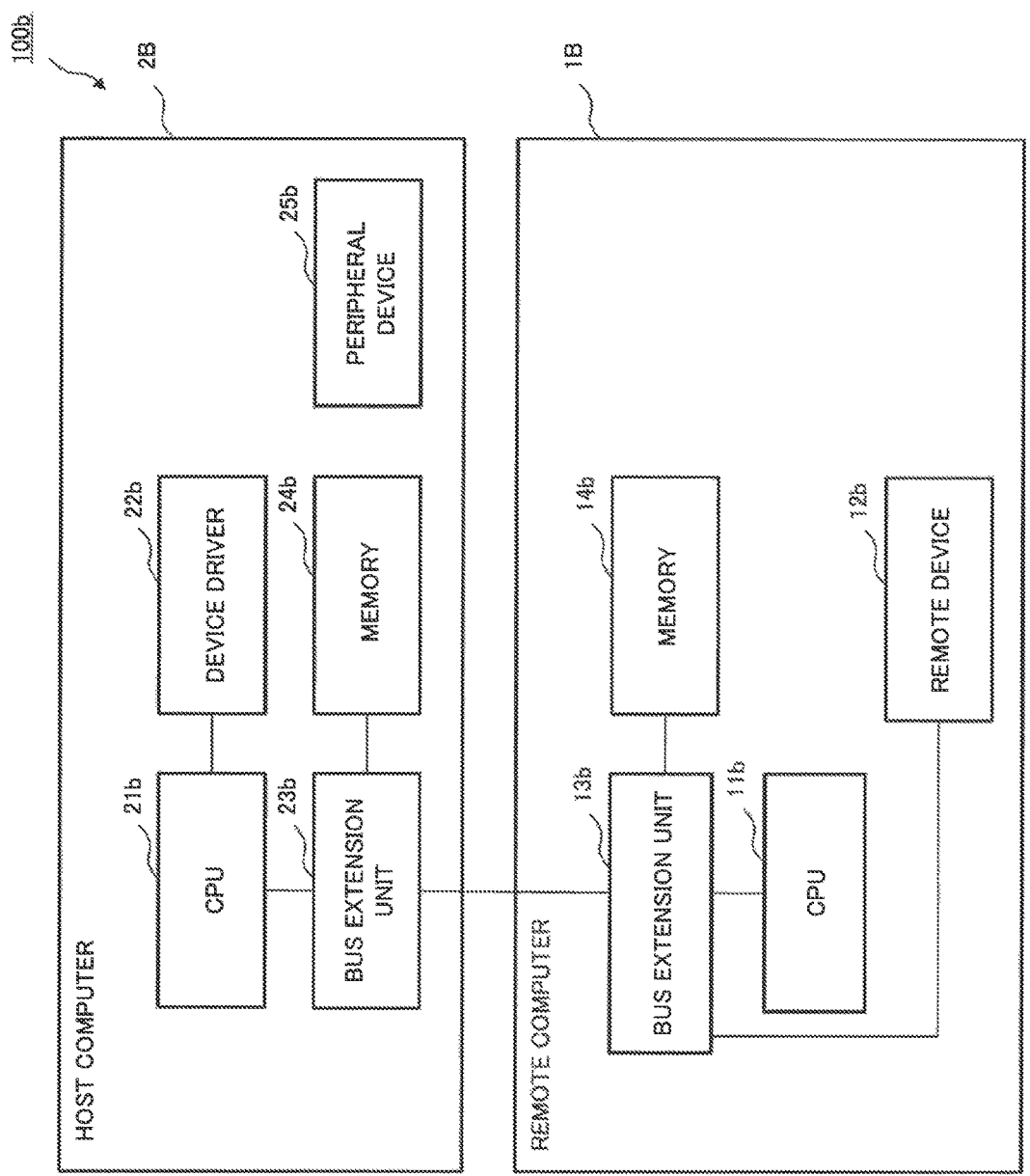
FIG. 9 is a diagram illustrating a configuration of a remote device control system in which a host computer and a remote computer are independent from each other.

At a time of actual system construction, a configuration, in which the host computer 2A and the remote computer 1A are completely independent from each other and are equipped with independent CPUs, memories, and the like, can be conceived. The above-mentioned configuration is selected because a preferred case is anticipated from a view point of the system construction. FIG. 9 illustrates a remote device control system 100b which includes a remote computer 1B equipped with a CPU and a memory.

The remote device control system 100b includes the remote computer 1B and a host computer 2B. The remote computer 1B includes a CPU 11b, a remote device 12b, a bus extension unit 13b and a memory 14b. The CPU 11b is a central control device which the remote computer 1B includes. The memory 14b is a storage device which the remote computer 1B includes. Since other devices and the like are similar to the devices illustrated in FIG. 8, explanation on the other devices is omitted.

However, in the remote device control system 100b illustrated in FIG. 9, DMA to the remote computer 1B is executed only to the memory 14b of the remote computer 1B. That is, in the remote device control system 100b, DMA cannot be executed between the device driver 22b of the host computer 2B and the remote device 12b of the remote computer 1B. The reason is that the remote computer 1B and the host computer 2B are not connected to each other through the bus or the like.

In example embodiments illustrated in the following, remote device control systems are described, in each of which DMA can be performed even between a host computer and a remote computer that are equipped with independent CPUs and memories as mentioned above.

First Example Embodiment

Remote Device Control System

A remote device control system 100 according to a first example embodiment includes a remote computer 1 and a host computer 2 as illustrated in FIG. 1. The remote computer 1 and the host computer 2 can communicate with each other through a network 3. Since the configuration of the host computer 2 is similar to the configurations illustrated in FIGS. 8 and 9, explanation on the configuration of the host computer 2 is omitted.

Remote Computer

The remote computer 1 includes a CPU 11, a remote device 12, a bus extension unit 13, a memory 14, a dummy driver 15, an error log storage unit 16 and an I/O memory management unit (IOMMU: Input/Output Memory Management Unit) 17. Furthermore, the remote computer 1 includes an OS which is not illustrated in the drawing.

The CPU 11 and the memory 14 of the remote computer 1 may have the same architecture as the architecture of a CPU 21 and the memory 24 of the host computer 2, and may have different architecture. Moreover, the OS may be the same OS of the host computer 2 or may be a different OS. The remote device 12 may be any device as far as a device driver 22 of the host computer 2 relates to the remote device 12.

The bus extension unit 13 forms a pair with a bus extension unit 23 existing on the host computer 2 side, and executes transmission or reception of the network packet through the network 3. The bus extension unit 13 and the bus extension unit 23 are composed of hardware, software or a combination of hardware and software. The bus extension unit 13 and the bus extension unit 23 form the pair and execute a network packet transfer. As a result, the device driver 22 on the host computer 2 side can execute DMA to the remote device 12 existing on the remote computer 1 side.

The device driver 22 recognizes the remote device 12 as if the remote device 12 were connected to the host computer 2. An I/O command, which the device driver 22 issues toward the remote device 12, is transferred from the bus extension unit 23 to the bus extension unit 13, and is transmitted to the remote device 12 after the following process described later is executed. Hereinafter, explanation continues the assumption that each of the bus extension units 13 and 23 is based on the PCI Express protocol, but the protocol of the present invention is not limited to this assumption.

The bus extension unit 13 receives the network packet, which is transmitted by the bus extension unit 23 existing on the host computer 2 side through a predetermined protocol layer (for example, the transaction layer in the case of PCI Express), and issues an I/O command in response to contents of command included in the received network packet. For example, in the case of receiving an I/O Write request of PCI Express, the bus extension unit 13 issues an OUT command out of a CPU command set. For example, in the case of receiving an I/O Read request of PCI Express, the bus extension unit 13 issues an IN command out of the CPU command set. Furthermore, in the case of receiving a Config command of PCI Express, the bus extension unit 13 returns held contents of registers of the device and the PCI Express Ethernet bridge to the bus extension unit 23.

The dummy driver 15 is software which is installed in OS of the remote computer 1 and executes an interrupt process for the I/O memory management unit 17 and an interrupt process for the remote device 12. The interrupt process (hereinafter, denoted as "interrupt") means to preferentially execute a process which needs to be executed urgently while a regular program is running, or a process which needs to be finished within a predetermined time, or means such process. The dummy driver 15 does not directly control the remote device 12. When an error interrupt occurs, the dummy driver 15 acquires a memory address and a size (hereinafter, denoted as "error information") at the time of the error. The dummy driver 15 includes a memory for temporarily storing such error information. Here, the dummy driver 15 and the bus extension unit 13 may be joined to form a single unit.

When an error occurs in the I/O memory management unit 17, the error log storage unit 16 records an error log of the error. The error log storage unit 16 may be arranged inside the I/O memory management unit 17. As a specific example of the I/O memory management unit, Vt-d of Intel Corporation or the like is exemplified.

When executing DMA, the I/O memory management unit 17 executes memory address conversion. The I/O memory management unit 17 includes a temporary storage unit which is used at a time of the memory address conversion. A specific example of the temporary storage unit is a page table (not illustrated in the drawing). The page table is a storage unit which only the I/O memory management unit 17 can use, and which is different from a page table used by a memory management unit (MMU: not illustrated in the drawing) included in the CPU 11.

FIG. 2 exemplifies an entry of the page table of the I/O memory management unit 17.

The page table can store a plurality of entries such as the above-mentioned entry. As illustrated in FIG. 2, the entry of the page table includes items of a logical physical-address, a physical address, a permission attribute, and the like. The logical physical-address is an address which software such as an OS or the like uses. The physical address is an address which hardware such as a memory device or the like uses. The permission attribute means permission of reading/writing. These data items are minimum, and the entry may include other data items.

By using the entry, the I/O memory management unit 17 executes address conversion from the logical physical-address to the physical address for DMA which is utilized to enable the device driver 22 to read from or write to the remote device 12.

In the case that the permission attribute is read-writable, both of reading and writing from the remote device 12 can be executed. In the case that the permission attribute is readable, data reading from the remote device 12 can be executed, but no data writing is executed. In the case that the permission attribute is writable, data writing to the remote device 12 can be executed, but no data reading is executed.

Operation of Remote Device Control System

Next, an operation of the remote device control system 100 will be explained. The operation of the remote device control system 100 is divided into two processes as main components. That is, one is DMA-Write in which data is written to the memory 24 of the host computer 1 from the memory 14 of the remote computer, and the other is DMA-Read in which data is read from the memory 24 to the memory 14. Hereinafter, the operation will be explained with reference to flowcharts illustrated in FIGS. 3 and 4.

Operation of DMA-Write

Figure 3:
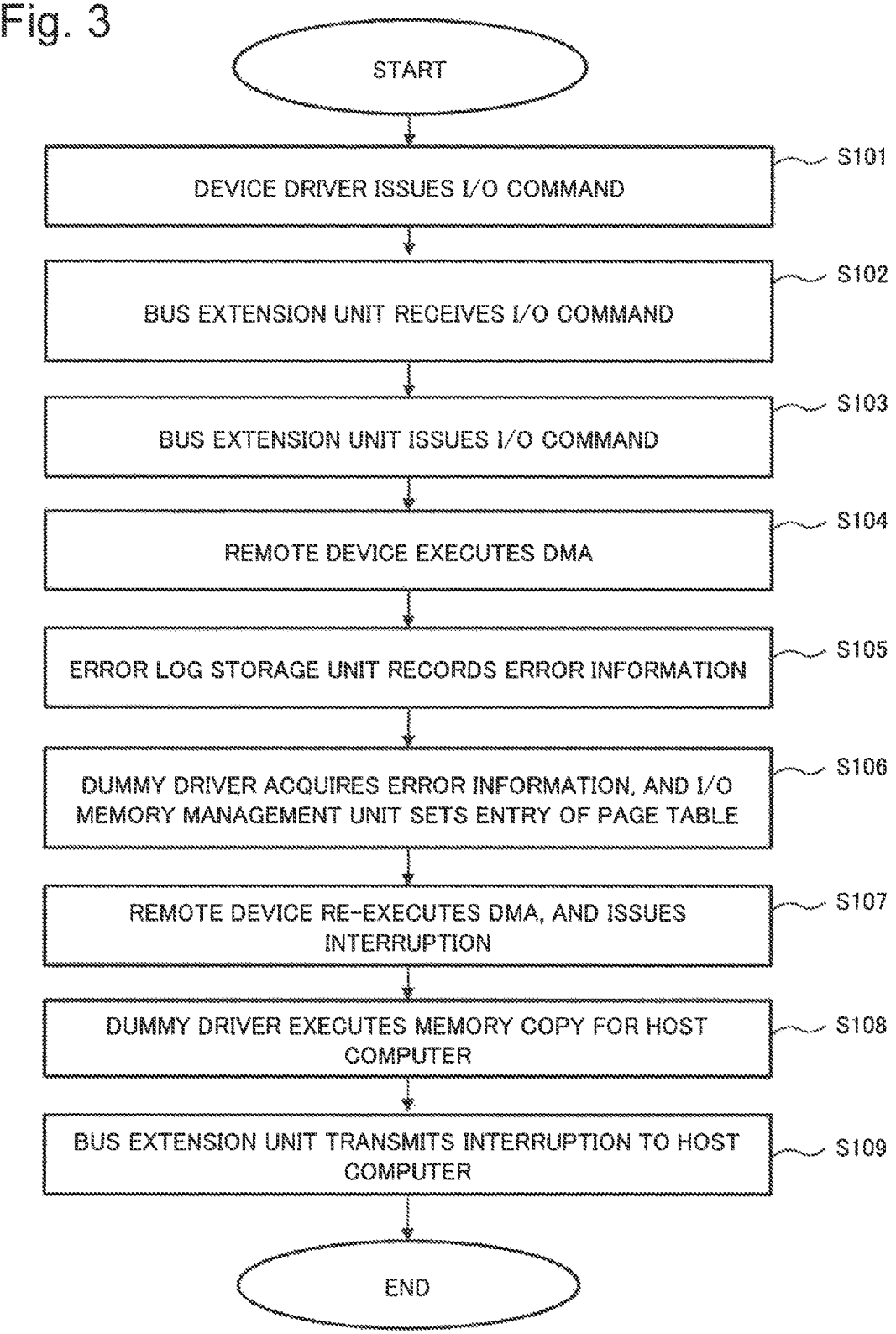
FIG. 3 is a flowchart illustrating an operation of a DMA-Write process of the remote device control system according to the first example embodiment of the present invention.

Operations of the host computer 2 and the remote computer 1, which are executed in the case of DMA-Write, will be explained with reference to the flowchart illustrated in FIG. 3.

Firstly, in Step S101, the device driver 22 of the host computer 2 issues an I/O command for the remote device 12 of the remote computer 1. It is assumed that the I/O command is a command which makes the remote device 12 execute DMA-Write, that is, an OUT command, as a first DMA transfer. The OUT command which the device driver 22 issues is converted into an I/O command on the bus by the bus extension unit 23 existing on the host computer 2 side and transmitted to the network 3.

In Step S102, the bus extension unit 13 of the remote computer 1 receives the I/O command through the network 3.

In Step S103, the bus extension unit 13 issues an I/O command in response to the received I/O command. In this case, the bus extension unit 13 issues an OUT command.

It is assumed that the OUT command is a trigger which activates DMA in the remote device 12.

In Step S104, upon receipt of the issued OUT command, the remote device 12 executes DMA. Specifically, the remote device 12 issues a Memory-Write command (memory write command) to the I/O memory management unit 17. The command includes data to be written in the memories 14 and 24, a data size of the data and a memory address (write address) in which the data needs to be written. At this point of time, an entry which is related to the write address of data is not set in the page table of the I/O memory management unit 17. While the I/O memory management unit 17, which received the write address, executes retrieval in the page table which is related to the write logical physical-address, the I/O memory management unit 17 fails in the retrieval since the entry is not set in the page table yet.

Therefore, after failure of the Memory-Write command, in Step S105, the I/O memory management unit 17 makes the error log memory unit 16 record the memory address and the size as error information, which indicates an address conversion error, and sends an error interrupt to the CPU 11 of the remote computer 1 with which the remote device 12 is connected.

In Step S106, the CPU 11, which received the error interrupt, calls the dummy driver 15. The dummy driver 15 acquires the error information by executing retrieval in the error log storage unit 16, and temporarily stores the acquired error information. Furthermore, according to the Memory-Write command, the I/O memory management unit 17 receives the error information which is temporarily stored, and sets an entry including the write address (transfer destination address), which is related to the error information, in the page table. Afterward, the dummy driver 15 instructs the remote device 12 to re-execute DMA (second DMA transfer).

In Step S107, the remote device 12 re-executes DMA-Write. Since the entry based on the error information is set in the page table of the I/O memory management unit 17 at this time, the Memory-Write command is executed normally. As a result, data from the remote device 12 are written in the memory 14 of the remote computer 1. Here, while a case that a piece of error information exists has been described in the above, the above-mentioned process from S101 to S106 may be repeated by necessary number of times for a plurality of pieces of error information.

Next, as a normal operation, the remote device 12 issues an interrupt to the device driver 22 when DMA is completed.

In Step S108, this interrupt is received not by the device driver 22 but by the dummy driver 15. Referring to the memory address and the data size included in the error information stored temporarily, the dummy driver 15 copies data, which exists at the above-mentioned memory address of the memory 14 of the remote computer 1 and which have the above-mentioned data size, and writes the copied data at the same memory address of the memory 24 of the host computer 2.

As a means of transferring data between the memories 14 and 24, a device based on RDMA (Remote Direct Memory Access) may be used, or a program, which is made so as to work on the host computer, may be transferred to be written in the memory 24 of the host computer 2.

Afterward, the dummy driver 15 notifies the bus extension unit 13 of completion of DMA-Write.

In step S109, the bus extension unit 13, which received the notice on completion of DMA-Write, transmits an interrupt command such as MSI (Message Signaled Interrupt) of PCI Express or the like to the host computer 2. The host computer 2 which received the interrupt command calls the device driver 22 which is a handler of the DMA-Write process. By executing the above, a series of DMA-Write process has been completed.

Operation of DMA-Read

Figure 4:
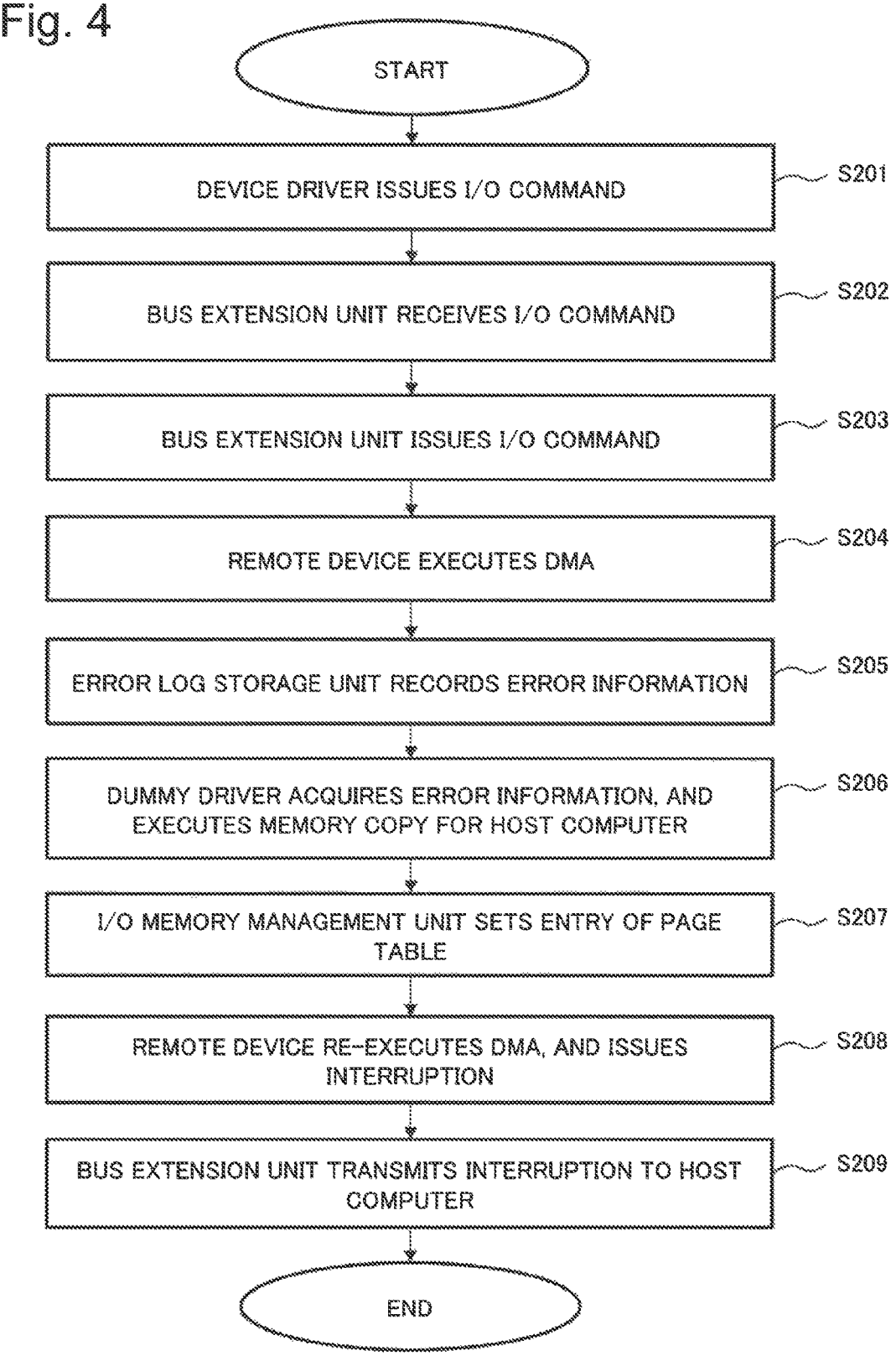
FIG. 4 is a flowchart illustrating an operation of a DMA-Read process of the remote device control system according to the first example embodiment of the present invention.

Operations of the host computer 2 and the remote computer 1, which are executed in the case of DMA-Read, will be explained with reference to the flowchart illustrated in FIG. 4.

Firstly, in step S201, the device driver 22 of the host computer 2 issues an I/O command for the remote device 12 on the remote computer 1 side. It is assumed that this I/O command is a command (first DMA transfer) which makes the remote device 12 execute DMA-Read. An OUT command which the device driver 22 issues is converted into an I/O command on the bus by the bus extension unit 23 of the host computer 2 and transmitted to the network 3.

In Step S202, the bus extension unit 13 of the remote computer 1 receives the I/O command through the network 3.

In Step S203, the bus extension unit 13 issues an I/O command in response to the received I/O command. In this case, the bus extension unit 13 issues an OUT command. At this point of time, an entry which is related to the address for reading data is not set in the page table of the I/O memory management unit 17.

In Step S204, the remote device 12, which received the issued OUT command, issues a Memory-Read command to the I/O memory management unit 17. At this time, this command includes data to be read from the memory 14, a data size of the data and a memory address from which data is to be read. While the I/O memory management unit 17, which received the read address, executes retrieval in a table which is related to the read logical physical-address, the I/O memory management unit 17 fails in the retrieval since an entry including the address is not set in the table yet.

Therefore, after failure of the Memory-Write command, in Step S205, the I/O memory management unit 17 makes the error log memory unit 16 record the memory address and the size as the error information, and sends an error interrupt to the CPU 11, with which the remote device 12 is connected, in the remote computer 1.

In Step S206, the CPU 11, which received the error interrupt, calls the dummy driver 15. The dummy driver 15 acquires the error information by executing retrieval in the error log storage unit 16, and temporarily stores the acquired error information. Furthermore, according to the Memory-Read command included in the error information, the dummy driver 15 acquires data (hereinafter, denoted as "memory data"), which have the data size indicated by the Memory-Read command starting from the memory address indicated by the Memory-Read command, from the memory 24 of the host computer 2. As a means of acquiring data, a device based on RDMA may be used, or the data of the host computer 2 may be acquired and transferred by a program which is made so as to work on the host computer 2.

In Step S207, the dummy driver 15, which acquires the memory data from the host computer 2, writes the acquired data at the memory address, which is included by the Memory-Read command, in the memory 14 of the remote computer 1. The I/O memory management unit 17 sets a page table entry which is related to the memory address. Here, while a case that a piece of error information exists has been described in the above, the above-mentioned process from S201 to S206 may be repeated by necessary number of times for a plurality of pieces of error information.

Afterward, the dummy driver 15 instructs the remote device 12 to re-execute DMA (second DMA transfer).

In Step S208, the remote device 12, which is instructed to re-execute DMA, executes the Memory-Read command again. Since the entry including the address is set in the page table of the I/O memory management unit 17 at this time, the Memory-Read command is executed normally. As a result, data which are read from the memory 14 of the remote computer 1 are written in the remote device 12.

Next, as a normal operation, the remote device 12 sends an interrupt to the device driver 22 when DMA is completed. This interrupt is received not by the device driver 22 but by the dummy driver 15. The dummy driver 15, which received the interrupt, notifies the bus extension unit 13 of completion of DMA-Read.

In step S209, the bus extension unit 13, which received the notice on completion of DMA-Read, transmits an interrupt command such as MSI of PCI Express or the like to the host computer 2.

The host computer 2 which received the interrupt calls the device driver 22 which is a handler of the DMA-Read process. By executing the above, a series of DMA-Read process has been completed.

Specific Example

Hereinafter, a specific example of the present example embodiment will be explained.

Firstly, it is assumed that the page table of the I/O memory management unit 17 is in a state illustrated in FIG. 5. Moreover, it is assumed that the dummy driver 15 is installed in the OS of the remote device 12, and an interrupt number is 10. Moreover, it is assumed that an interrupt number of the remote device 12 is 20.

Furthermore, it is assumed that the device driver 22 of the host computer 2 issues an I/O command, and this I/O command is DMA-Write which indicates that the physical memory address is 0x4000 and the data size is 256 bytes (0x100 bytes in the hexadecimal form). When the remote device 12 executes this DMA, the I/O memory management unit 17 looks up the page table. However, since there is no page table entry for the logical physical-address of 0x4000 in the page table state illustrated in FIG. 5, the lookup fails.

The I/O memory management unit 17 writes information regarding this failure, which includes the following, in the error log storage unit 16, and sends an interrupt (number 10) to the CPU 11 of the remote device 12.

error: write failure
starting address: 0x4000
size: 0x100

Since the dummy driver 15 is registered as the device driver 22 corresponding to the interrupt number 10, the dummy driver 15 is called. Referring to the error log storage unit 16, the dummy driver 15 acquires the information which includes the following.

error: write failure
starting address: 0x4000
size: 0x100

The dummy driver 15 then generates an entry, which includes the following, in the page table of the I/O memory management unit 17.

logical physical-address 0x4000
physical address 0x4000
writable

As a result, the page table is changed to the state illustrated in FIG. 6. Moreover, the dummy driver 15 temporarily stores the error information which is acquired from the error log storage unit 16.

Next, the dummy driver 15 makes the remote device 12 re-execute DMA. As a means of re-executing DMA, for example, the dummy driver 15 may make the bus extension unit 13 re-execute the I/O command which has been executed at a previous time, or the like. The remote device 12 re-executes DMA-Write which indicates that the physical memory address is 0x4000, and the data size is 256 bytes (0x100 bytes in the hexadecimal form).

At this time, the page table of the I/O memory management unit 17 is in the state illustrated in FIG. 6. Accordingly, when executing retrieval in the page table, the I/O memory management unit 17 finds that the entry which is related to 0x4000 exists. Then, the I/O memory management unit 17 acquires the entry which includes the following.

logical physical-address 0x4000 physical address 0x4000 writable

Since the permission attribute is "writable", the DMA-Write command is executed. On the basis of this command, the I/O memory management unit 17 executes memory address conversion from the logical physical-address 0x4000 into the physical address 0x4000 (because of the same address, the conversion is not carried out substantially), and executes memory writing whose physical address is 0x4000 and whose data size is 256 bytes. Because of successful DMA, no data is written in the error log storage unit 16 at this time.

The remote device 12 which successfully executed DMA-Write sends an interrupt (number 20) to the CPU 11. The CPU 11 which received the interrupt calls the dummy driver 15 which is a handler of the interrupt number 20.

Since the interrupt number is 20, the called dummy driver 15 acquires information of "0x4000 and data size 256 bytes" by referring to the error information which is saved in advance. The dummy driver 15 writes data of 256 bytes starting from the physical address of 0x4000 in the memory 14 of the remote computer 1, to the physical address of 0x4000 of the memory 24 of the host computer 2. Afterward, the dummy driver 15 notifies the bus extension unit 13 of completion of the interrupt.

The bus extension unit 13, which is notified of completion of the interrupt, transmits an interrupt (number 30) to the host computer 2 by using the protocol of MSI of PCI Express. The OS of the host computer 2 which received the interrupt number 30 calls the device driver 22 which is a handler to process the number 30.

By executing the above, DMA from the device driver 22 to the remote device 12 has been completed.

According to the first example embodiment of the present invention, it is possible to appropriately achieve the DMA data transfer between the host computer 20 and the remote computer 10 even in the case that the host computer 2 and the remote computer 1 are equipped with independent CPUs. The reason is the following. When a command requesting a DMA transfer is received from the device driver 22, a first DMA transfer is executed and fails. This failure of the command causes error information to be recorded, and based on the error information, a transfer destination address of the first DMA transfer is detected. Executing a second DMA transfer with respect to the detected transfer destination address enables the transfer of data existing at the transfer destination address between the memory 24 of the host computer 20 and the memory 14 of the remote computer 10.

Second Example Embodiment

Remote Computer

Figure 7:
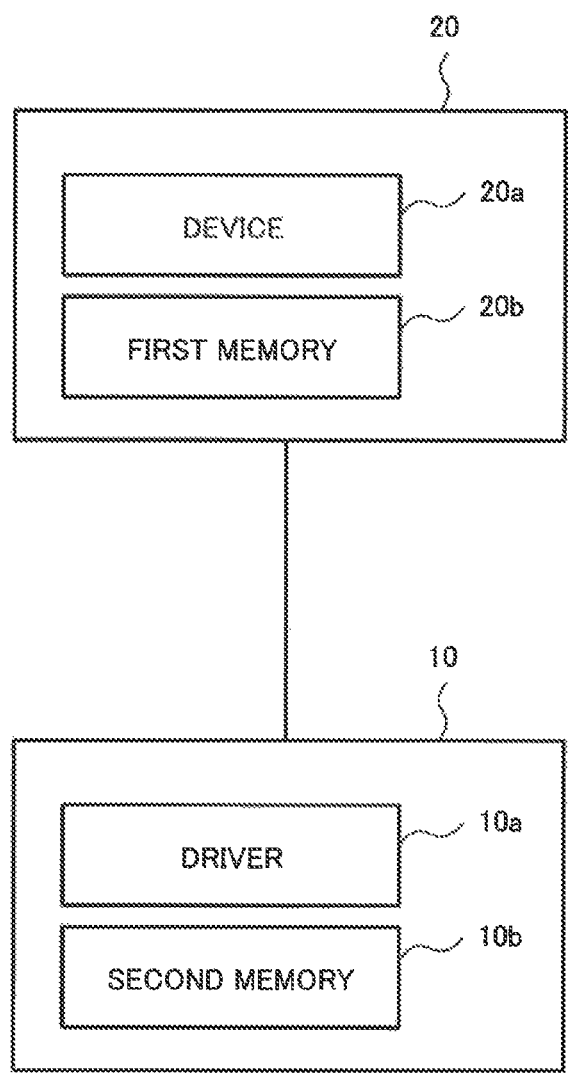
FIG. 7 is a diagram illustrating a configuration of a remote device control system according to a second example embodiment of the present invention.

A remote computer 10 according to a second example embodiment is connectable with a host computer 20 as illustrated in FIG. 7.

The host computer 20 includes a driver 20a and a first memory 20b. The driver 20a controls a device 10a. The first memory 20b is a storage device which the host computer 20 side includes.

The remote computer 10 includes the device 10a and a second memory 10b.

The device 10a is a peripheral equipment such as a printer or the like. The second memory 10b is a storage device which the remote computer 10 side includes. Upon detecting a transfer destination address of a first DMA transfer on the basis of results of the first DMA transfer executed on the basis of a DMA transfer command received from the driver 20a, the remote computer 10 executes a second DMA transfer to the transfer destination address of the first DMA transfer in order for data existing at the transfer destination address to be transferred between the first memory 20b and the second memory 10b.

According to the second example embodiment of the present invention, even in the case that the host computer 20 and the remote computer 10 are independent from each other, it is possible to achieve the DMA data transfer between the host computer 20 and the remote computer 10.

INDUSTRIAL APPLICABILITY

The present invention is applicable to a system in which, in an environment that a computer and a device exist separately so as to be able to communicate each other through a network, OS of a host computer controls a remote device that is a communication partner. Particularly, in this system, the present invention is applicable at a time of executing a DMA transfer between the remote device of a remote computer having CPU and a memory, and the host computer.

Hereinbefore, the present invention has been explained by using the above-mentioned example embodiment as an exemplary example. However, the present invention is not limited to the above-mentioned example embodiment. That is, the present invention can apply various aspects, which a person skilled in the art can understand, within the scope of the present invention.

This application is based upon and claims the benefit of priority from Japanese Patent Application No. 2015-006417, filed on Jan. 16, 2015, the disclosure of which is incorporated herein in its entirety by reference.

REFERENCE SIGNS LIST 1 remote computer
2 host computer
11 CPU
12 remote device
13 bus extension unit
14 memory
15 dummy driver
16 error log storage unit
17 I/O memory management unit
21 CPU
22 device driver
23 bus extension unit
24 memory
25 peripheral device

The invention claimed is:

1. A computer system comprising:
a host computer that is communicably connected with a second computer, wherein the host computer includes a first memory and a driver for controlling a device of the second computer, the second computer includes a second memory,
the host computer:
executes a first direct memory access (DMA) transfer based on a DMA transfer request received from the driver, the first DMA transfer transferring data to a transfer destination address,
executes a second DMA transfer to transfer data existing at the transfer destination address of the first memory to the second memory, and
detects the transfer destination address as a result of executing the first DMA transfer,
the second computer further comprises an input/output (I/O) memory management unit and a second driver,
a record is recorded by a storage unit which the I/O memory management unit manages,
the second driver acquires the transfer destination address by executing retrieval in the storage unit, and
the second driver:
requests the second DMA to transfer:
receives an interrupt from the device when the second DMA is completed, and
initiates a data transfer between the first memory and the second memory using receipt of the interrupt as a trigger.

2. The computer system according to claim 1, wherein the second driver transmits an interrupt, which is generated at a time of the data transfer, to the driver of the first computer.

3. The computer system according to claim 1, wherein the record further includes a transfer data size which is stored at the transfer destination address.

4. A device control system comprising:
computer system according to claim 1; and
the first computer, wherein the first computer and the computer are connected to each other so as to be able to communicate through a network.

5. The device control system according to claim 4, wherein the first computer and the computer are each equipped with an individual central processing unit (CPU).

6. The device control system according to claim 4, wherein
the first computer includes a first bus extension unit,
the computer includes a second bus extension unit,
the first bus extension unit and the second bus extension unit are connected to each other through the network so as to be able to communicate,
data relating to the DMA transfer between the driver and the device is converted into a packet by the first bus extension unit and the second bus extension unit, and
transmission and reception of the packet is executed between the first bus extension unit and the second bus extension unit.

7. The device control system according to claim 4, wherein an interface of the network is PCI Express.

8. A device control method comprising:
executing, by a host computer, a first direct memory access (DMA) transfer based on a DMA transfer request received from a driver, the first DMA transfer transferring data to a transfer destination address, and
executing, by the host computer, a second DMA transfer to transfer data existing at the transfer destination address of a first memory of the host computer to a second memory of a second computer, the transfer destination address being detected as a result of executing the first DMA transfer, wherein
the host computer is communicably connected with the second computer,
the host computer includes a first memory and a driver for controlling a device of the second computer,
the second computer further comprises an input/output (I/O) memory management unit and a second driver,
a record is recorded by a storage unit which the I/O memory management unit manages,
the second driver acquires the transfer destination address by executing retrieval in the storage unit, and
the second driver:
requests the second DMA to transfer,
receives an interrupt from the device when the second DMA is completed, and
initiates a data transfer between the first memory and the second memory using receipt of the interrupt as a trigger.

9. The computer system according to claim 1, wherein the second driver transmits an interrupt to the driver of the first computer, is the interrupt being generated at a time of the data transfer between the first memory and the second memory.

10. The computer system according to claim 2, wherein the record further includes a transfer data size which is stored at the transfer destination address.

11. The device control system according to claim 5, wherein
the first computer includes a first bus extension unit,
the computer includes a second bus extension unit, and the first bus extension unit and the second bus extension unit are connected to each other through the network so as to be able to communicate, and
data relating to the DMA transfer between the driver and the device is converted into a packet by the first bus extension unit and the second bus extension unit, and
transmission and reception of the packet is executed between the first bus extension unit and the second bus extension unit.

12. The device control system according to claim 5, wherein an interface of the network is PCI Express.

13. The device control system according to claim 6, wherein an interface of the network is PCI Express.

* * * * *

UNITED STATES PATENT AND TRADEMARK OFFICE
CERTIFICATE OF CORRECTION

PATENT NO. : 10,482,044 B2
APPLICATION NO. : 15/541393
DATED : November 19, 2019
INVENTOR(S) : Masahiko Takahashi It is certified that error appears in the above-identified patent and that said Letters Patent is hereby corrected as shown below:

In the Claims

Column 13, Line 25; In Claim 1, delete "transfer:" and insert --transfer,-- therefor Column 13, Line 38; In Claim 4, before "computer", insert --the--

Signed and Sealed this
Twenty-fourth Day of November, 2020

Andrei Iancu
*Director of the United States Patent and Trademark Office*